(12) United States Patent
Hegenbart et al.

(10) Patent No.: US 12,576,984 B2
(45) Date of Patent: Mar. 17, 2026

(54) FUSELAGE FOR AN AIRCRAFT OR SPACECRAFT, AND AIRCRAFT OR SPACECRAFT

(71) Applicant: Airbus Operations GmbH, Hamburg (DE)

(72) Inventors: Matthias Hegenbart, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/055,825

(22) Filed: Feb. 18, 2025

(65) Prior Publication Data

US 2025/0269975 A1 Aug. 28, 2025

(30) Foreign Application Priority Data

Feb. 22, 2024 (EP) ..................................... 24159056

(51) Int. Cl.
| | |
|---|---|
| *B64D 37/32* | (2006.01) |
| *B64C 1/08* | (2006.01) |
| *B64D 37/30* | (2006.01) |
| *B64D 45/00* | (2006.01) |

(52) U.S. Cl.
CPC ................ *B64D 37/32* (2013.01); *B64C 1/08* (2013.01); *B64D 37/30* (2013.01); *B64D 2045/009* (2013.01)

(58) Field of Classification Search
CPC .......... B64D 37/04; B64D 37/32; B64C 1/00; B64C 1/06; B64C 1/0685; B64C 1/12; B64C 1/22; B64C 1/38; B64G 1/00; B64G 1/14; B64G 1/22; B64G 99/00; A62C 3/08
See application file for complete search history.

(56) References Cited

U.S. PATENT DOCUMENTS

| | | | | |
|---|---|---|---|---|
| 11,794,873 B2 * | 10/2023 | Pearson | ................ | B64D 29/04 |
| 11,807,382 B1 * | 11/2023 | Lohe | .................... | B64D 27/357 |
| 2010/0032525 A1 * | 2/2010 | Piesker | ................ | B64C 1/1453 |
| | | | | 244/136 |
| 2011/0101163 A1 * | 5/2011 | Haack | ................... | B64C 1/0685 |
| | | | | 244/119 |
| 2018/0105282 A1 * | 4/2018 | Tweet | .................... | A62C 3/065 |
| 2019/0161211 A1 | 5/2019 | Arana Hidalgo | | |
| 2023/0415907 A1 | 12/2023 | Puschmann | | |

FOREIGN PATENT DOCUMENTS

EP 0980822 A1 2/2000

OTHER PUBLICATIONS

Extended European Search Report in EP Application No. 24159056. 1, dated Aug. 8, 2024, 8 pages.

* cited by examiner

*Primary Examiner* — Joshua D Huson
*Assistant Examiner* — Anna L. Gordon
(74) *Attorney, Agent, or Firm* — KDW Firm PLLC

(57) ABSTRACT

A fuselage for an aircraft or spacecraft includes a first fuselage section having a support structure with a load bearing outer skin, and a second fuselage section having a non-load bearing outer skin and a space frame structure for supporting the non-load bearing outer skin, wherein the non-load bearing outer skin includes at least one skin area, which is configured to be openable for venting a compartment, which is at least sectionwise enclosed by the at least one skin area. An aircraft or spacecraft is disclosed including the a fuselage.

20 Claims, 4 Drawing Sheets

1

10

FUSELAGE FOR AN AIRCRAFT OR SPACECRAFT, AND AIRCRAFT OR SPACECRAFT

TECHNICAL FIELD

The disclosure herein relates to a fuselage for an aircraft or spacecraft. The disclosure herein is furthermore concerned with an aircraft or spacecraft containing such a fuselage.

BACKGROUND

In hydrogen powered aircrafts cryogenic liquids and/or gases are stored and distributed within the aircraft. For example, a hydrogen tank which contains hydrogen (H2) or liquid hydrogen (LH2) can be stored in the rear of the aircraft fuselage. It is necessary to monitor the integrity of the hydrogen tank in order to detect possible failures in a timely manner.

Once there is detected a failure, several measures for dealing with the failure, for example a leakage in the hydrogen tank or distribution system, are known. Some measures flood tank regions with an inert gas, such as for example nitrogen. The inert gas prevents the accumulation of an explosive gas mixture.

Nevertheless, the cryogenic liquid and/or gas remains inside the aircraft. Furthermore, the inert gas need to be stored inside the aircraft in a high amount, which is negative for a weight and/or a package of the aircraft.

Aspects of the disclosure herein may provide solutions for venting the fuselage to prevent an accumulation of a fluid inside the fuselage.

According to the disclosure herein, this problem is solved in each case by the subject matter disclosed herein.

SUMMARY

According to a first aspect of the disclosure herein, a fuselage for an aircraft or spacecraft is provided. The fuselage comprises a first fuselage section having a support structure with a load bearing outer skin. Further, the fuselage comprises a second fuselage section having a non-load bearing outer skin and a space frame structure for supporting the non-load bearing outer skin. The non-load bearing outer skin comprises at least one skin area. The at least one skin area is configured to be openable for venting a compartment, which is at least sectionwise enclosed by the at least one skin area.

According to a second aspect of the disclosure herein, an aircraft or spacecraft comprising a fuselage according to the first aspect of the disclosure herein is provided.

A fundamental concept of the disclosure herein is to provide a system for the venting of the fuselage for liquid on-board hydrogen storage, in particular for liquid on-board hydrogen storage, containing a liquid hydrogen tank. The system or fuselage, respectively, improves a handling of different cases that can appear on ground or in flight. Such cases can be for example venting a hydrogen leakage to prevent explosion or ignition, venting in the case of fire, venting for avoiding an overpressure, handling of a liquid cryogenic release or similar cases.

The disclosure herein can be applied on ground as well as in flight. For example, the space frame structure can be configured to keep the second fuselage section intact without at least parts of the non-load bearing outer skin, in particular without the at least one skin area that can be opened for venting. That means, the aircraft may remain maneuverable when the at least one skin area is opened.

The compartment can be configured as a hydrogen tank compartment, in which a hydrogen tank is arranged for supplying a hydrogen powered aircraft, for example. A pressure bulkhead can be arranged at a transition region between the first fuselage section and the second fuselage section.

A particular advantage in the solution according to an aspect of the disclosure herein is that an accumulation of a fluid inside the compartment can be prevented. Furthermore, an overpressure in the compartment can be avoided.

Another advantage in the solution according to an aspect of the disclosure herein is that some emergency cases such as a fire or a hydrogen leakage, which could result in a flammable gas mixture can be handled sufficiently.

Advantageous embodiments and further developments emerge from the description with reference to the figures.

According to some embodiments of the disclosure herein, the at least one skin area comprises a first skin area and a second skin area, wherein the first skin area is configured to be openable independently from the second skin area. Thus, the first skin area can be opened, wherein the second skin area can remain closed. Therefore, the venting effect can be controlled according to the amount of venting that is needed.

According to some further embodiments of the disclosure herein, the at least one skin area is configured to be openable by pivoting the at least one skin area about an angle in a range of 0° to about 90°, preferably in a range of 0° to about 60°, in particular in a range of 0° to about 45°. For example, the at least one skin area is pivotable about an angle in a range of 0° to about 90° when the aircraft or spacecraft is on ground. For example, the at least one skin area is pivotable about an angle in a range of 0° to about 45° when the aircraft or spacecraft is in flight. In particular, the at least one skin area is configured to be openable by pivoting the at least one skin area away from the space frame structure such that the at least one skin area protrudes from the non-load bearing outer skin.

For example, the space frame structure can comprise a plurality of frames extending along a circumference of the fuselage. Furthermore, the space frame structure can comprise a plurality of stringers extending along a longitudinal axis of the fuselage, wherein the stringers are coupled to the frames. Additionally, the space frame structure can comprise a plurality of trusses extending diagonal between the frames and/or the stringers. The trusses can be configured as stiffening beams or as stiffening cables.

According to some further embodiments of the disclosure herein, the first skin area and the second skin area are configured to be openable by pivoting them about different angles. Hence, the angle can be adapted to a position of the skin area and/or to a flight situation including a ground position.

For example, the first skin area can be positioned at an upper region of the second fuselage section and the second skin area can be positioned at a lateral region of the second fuselage section. With these positions the first skin area could be opened the maximum angle, wherein the second skin area can remain closed or be opened up to an angle of about 10° when the aircraft is on ground. As a result, people and/or objects being present at a lateral side of the fuselage do not become affected by the venting effect since the fuselage can be vented by the upper region.

According to some further embodiments of the disclosure herein, the angle of 0° corresponds to a closed state of the at least one skin area, in which the at least one skin area prevents an exchange of gas and condensed mass between the compartment and an environment. The angle in a range of above 0° to about 90° corresponds to an opened state for venting the compartment. In the closed state, the fuselage has an improved aerodynamic surface, in particular in comparison to the opened state.

According to some further embodiments of the disclosure herein, the at least one skin area is locked to the space frame structure in a closed state of the at least one skin area. Thus, the at least one skin area can be secured in the closed state. For example, the at least one skin area can be locked by a latching hook or similar. The latching hook can be configured as a latching hook of a cargo door.

According to some further embodiments of the disclosure herein, a hinge axis of the at least one skin area is arranged such that the at least one skin area is configured to be openable away from or towards a flight direction. Thus, by opening the at least one skin area towards the flight direction a forced venting of the compartment due to aerodynamic pressure can be provided.

Alternatively or additionally, the compartment can have a compartment pressure that is higher than an ambient pressure for improving the venting of the compartment. In embodiments in which the at least one skin area comprises the first skin area and the second skin area, the first skin area can be configured to be openable away from the flight direction, wherein the second skin area can be configured to be openable towards the flight direction. The hinge axis can be substantially oriented tangentially in relation to a circumference of the fuselage.

According to some further embodiments of the disclosure herein, the at least one skin area sectionwise overlaps an adjacent skin area in a closed state of the at least one skin area. The adjacent skin area can be configured as another openable skin area or as a non-openable skin area of the non-load bearing outer skin. For example, the non-openable skin area can form a frame around the at least one skin area. Alternatively, the at least one skin area forms a flat surface with the adjacent skin area.

According to some further embodiments of the disclosure herein, the second fuselage section further comprises an actuator, which is arranged and configured to open the at least one skin area by pivoting about a hinge axis. For example, the actuator can be configured as or comprise a hydraulic, an electro mechanical or a pneumatic pivot mechanism.

According to some further embodiments of the disclosure herein, the hinge axis is substantially oriented tangentially in relation to a circumference of the fuselage.

According to some further embodiments of the disclosure herein, at least a section of the space frame structure comprises a flame deflector shielding. Alternatively or additionally, at least a section of the space frame structure comprises a fire resistant lining for blocking flames.

According to some further embodiments of the disclosure herein, a flameless venting device for retaining flames can be placed on an inner side of the at least one skin area and configured to cover an opening in the space frame structure when the at least one skin area is the opened state.

According to some further embodiments of the disclosure herein, the at least one skin area is configured reclosable, in particular reclosable during flight. Hence, the fuselage can be reused or keep on its mission after reclosing the at least one skin area. Furthermore, the venting effect can be used again. Therefore, the at least one skin area can be opened after being reclosed.

Alternatively, the at least one skin area can be configured as a blowout panel.

Optionally, the second fuselage section can comprise a gas detection unit. The gas detection unit can be arranged in the compartment. The gas detection unit can be electronically coupled to a control unit for activating the at least one skin area to open, in particular for activating the actuator. Furthermore, the gas detection unit can be configured as a hydrogen leakage detection system. The at least one skin area can be opened automatically, semi-automatically or manually.

According to some further embodiments of the disclosure herein, the second fuselage section is arranged in an aft fuselage.

For example, the space frame structure can be configured as an isotruss space frame structure. The support structure can further comprise a plurality of frames and/or a plurality of stringers.

BRIEF DESCRIPTION OF THE DRAWINGS

The disclosure herein is explained more specifically below on the basis of the example embodiments indicated in the schematic figures, in which.

DETAILED DESCRIPTION

Figure 1:
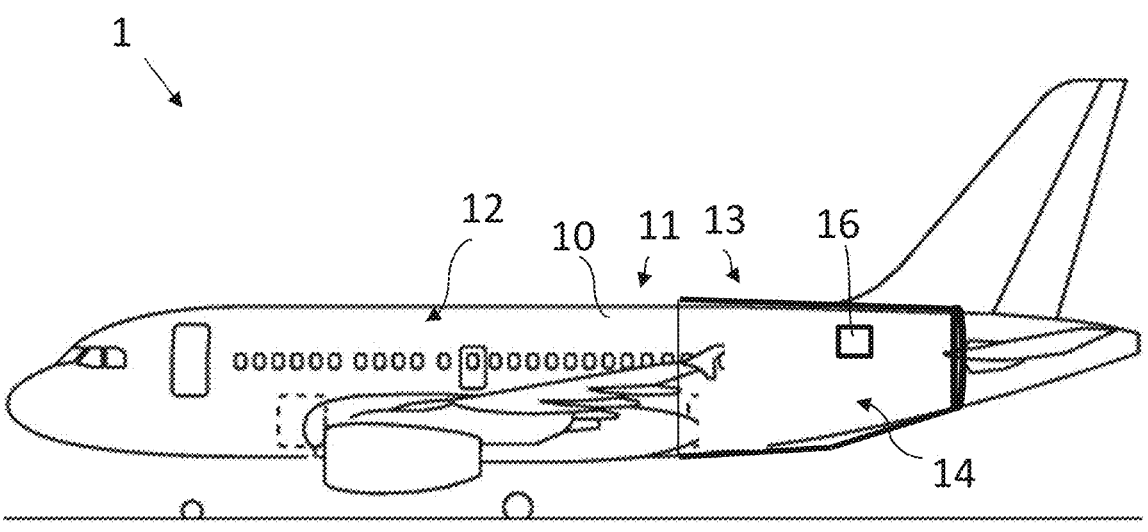
FIG. 1 shows a schematic illustration in a side view of an aircraft according to an embodiment of the disclosure herein comprising a fuselage for an aircraft or spacecraft.

The accompanying figures are intended to convey a further understanding of the embodiments of the disclosure herein. They illustrate embodiments and are used in conjunction with the description to explain principles and concepts of the disclosure herein. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs-unless explained otherwise.

FIG. 1 shows a schematic illustration in a side view of an aircraft 1 according to an embodiment of the disclosure herein comprising a fuselage 10 for an aircraft or spacecraft.

The fuselage 10 comprises a first fuselage section 11 having a support structure with a load bearing outer skin 12. Therefore, the first fuselage section 11 can be configured as a conventional aircraft fuselage. For example, the support structure can further comprise a plurality of frames and/or a plurality of stringers.

Further, the fuselage 10 comprises a second fuselage section 13 having a non-load bearing outer skin 14 and a space frame structure 15 for supporting the non-load bearing outer skin 14, wherein the non-load bearing outer skin 14 comprises at least one skin area 16, which is configured to be openable for venting a compartment, which is at least sectionwise enclosed by the at least one skin area 16.

The compartment can be configured as a hydrogen tank compartment, in which a hydrogen tank is arranged for supplying a hydrogen powered aircraft, for example. A pressure bulkhead can be arranged at a transition region between the first fuselage section 11 and the second fuselage section 13.

For example, the second fuselage section 13 can be arranged in an aft fuselage.

Figure 2:
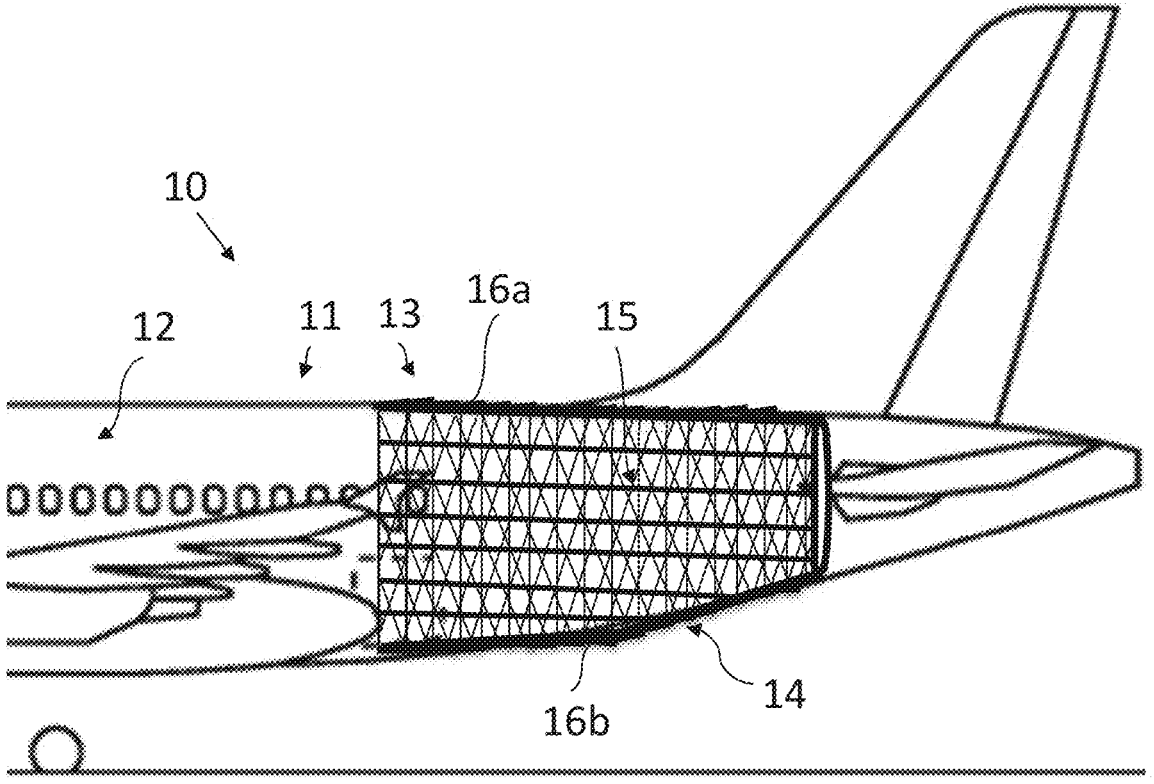
FIG. 2 shows a schematic illustration in a side view of an aft fuselage of the fuselage for an aircraft according to a further embodiment of the disclosure herein in a closed state.

FIG. 2 shows a schematic illustration in a side view of an aft fuselage of the fuselage 10 for an aircraft 1 according to a further embodiment of the disclosure herein in a closed state.

The fuselage 10 comprises a first fuselage section 11 having a support structure with a load bearing outer skin 12. Therefore, the first fuselage section 11 can be configured as a conventional aircraft fuselage. For example, the support structure can further comprise a plurality of frames and/or a plurality of stringers.

Further, the fuselage 10 comprises a second fuselage section 13 having a non-load bearing outer skin 14 and a space frame structure 15 for supporting the non-load bearing outer skin 14, wherein the non-load bearing outer skin 14 comprises at least one skin area 16, which is configured to be openable for venting a compartment, which is at least sectionwise enclosed by the at least one skin area 16. Here, the at least one skin area 16 comprises a plurality of skin tiles.

The skin tiles 16 can be configured to be openable by pivoting the at least one skin area 16 about an angle in a range of 0° to about 90°, preferably in a range of 0° to about 60°, in particular in a range of 0° to about 45°. For example, the skin tiles 16 can be pivotable about an angle in a range of 0° to about 90° when the aircraft or spacecraft is on ground. For example, the skin tiles 16 can be pivotable about an angle in a range of 0° to about 45° when the aircraft or spacecraft is in flight. In particular, the skin tiles 16 can be configured to be openable by pivoting each skin tile 16 away from the space frame structure 15 such that the skin tiles 16 protrude from the non-load bearing outer skin 14.

In particular, the angle of 0° may correspond to a closed state of the skin tiles 16, in which the skin tiles 16 prevent an exchange of gas and condensed mass between the compartment and an environment.

Here, the plurality of skin tiles 16 exemplarily comprises a first group of skin tiles 16a and a second group of skin tiles 16b, wherein the first group of skin tiles 16a is configured to be openable independently from the second group of skin tiles 16b. The first group of skin tiles 16a and the second group of skin tiles 16b can be configured to be openable by pivoting them about different angles. For example, the first group of skin tiles 16a can be positioned at an upper region of the second fuselage section 13, as it is illustrated in FIG. 2. Furthermore, the second group of skin tiles 16b can be positioned at a lateral region of the second fuselage section 13. Alternatively or additionally, the second group of skin tiles 16b can be positioned at a lower region of the second fuselage section 13, as it is illustrated in FIG. 2.

With these positions the first group of skin tiles 16a could be opened the maximum angle, wherein the second group of skin tiles 16b can remain closed or be opened up to an angle of about 10° when the aircraft is on ground. As a result, people and/or objects being present at a lateral side of the fuselage 10 do not become affected by the venting effect since the fuselage 10 can be vented by the upper region.

Optionally, the skin tiles 16 can be locked to the space frame structure 15 in the closed state of the skin tiles 16. Thus, the skin tiles 16 can be secured in the closed state. For example, the skin tiles 16 can be locked by a latching hook or similar. The latching hook can be configured as a latching hook of a cargo door.

The skin tiles 16 can sectionwise overlap each other in a closed state of the skin tiles 16. Alternatively, the skin tiles 16 can form a flat surface with each adjacent skin tile.

Figure 3:
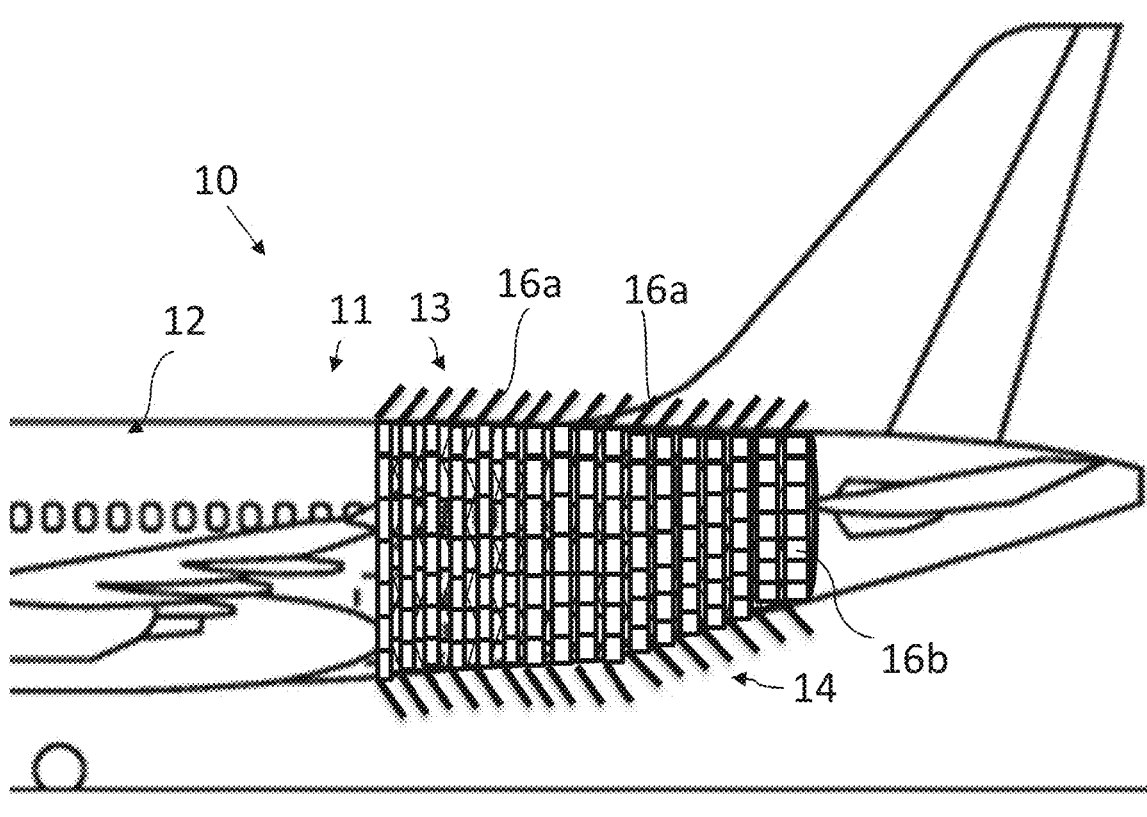
FIG. 3 shows a schematic illustration in a side view of an aft fuselage of the fuselage for an aircraft according to a further embodiment of the disclosure herein in an opened state.

FIG. 3 shows a schematic illustration in a side view of an aft fuselage of the fuselage 10 for an aircraft 1 according to a further embodiment of the disclosure herein in an opened state.

The fuselage 10 of FIG. 3 substantially corresponds to the fuselage of FIG. 2, wherein the fuselage 10 is here illustrated in the opened state. The skin tiles 16 are pivoted about an angle in a range of above 0° to about 90° that may correspond to the opened state for venting the compartment, for example.

Figure 6:
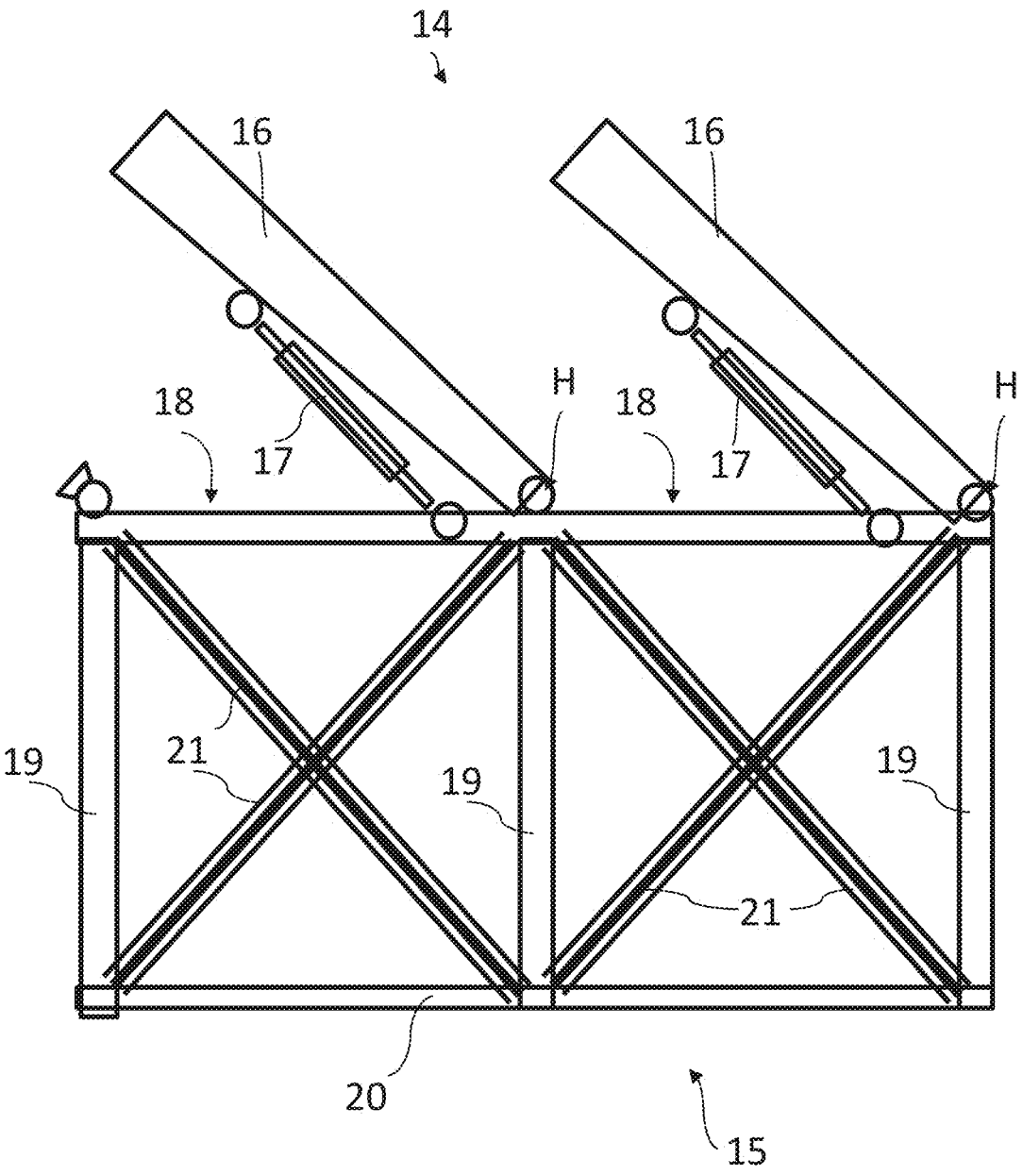
FIG. 6 shows a schematic illustration in a detail view of the second fuselage section according to FIG. 3 or 4 in the opened state.

Furthermore, a hinge axis H (as it is illustrated in FIG. 6) of the skin tiles 16 can be arranged such that the skin tiles 16 can be configured to be openable away from a flight direction. For example, the compartment can have a compartment pressure that is higher than an ambient pressure for improving the venting of the compartment through the skin tiles 16 opened away from the flight direction. The hinge axis H can be substantially oriented tangentially in relation to a circumference of the fuselage 10.

Figure 4:
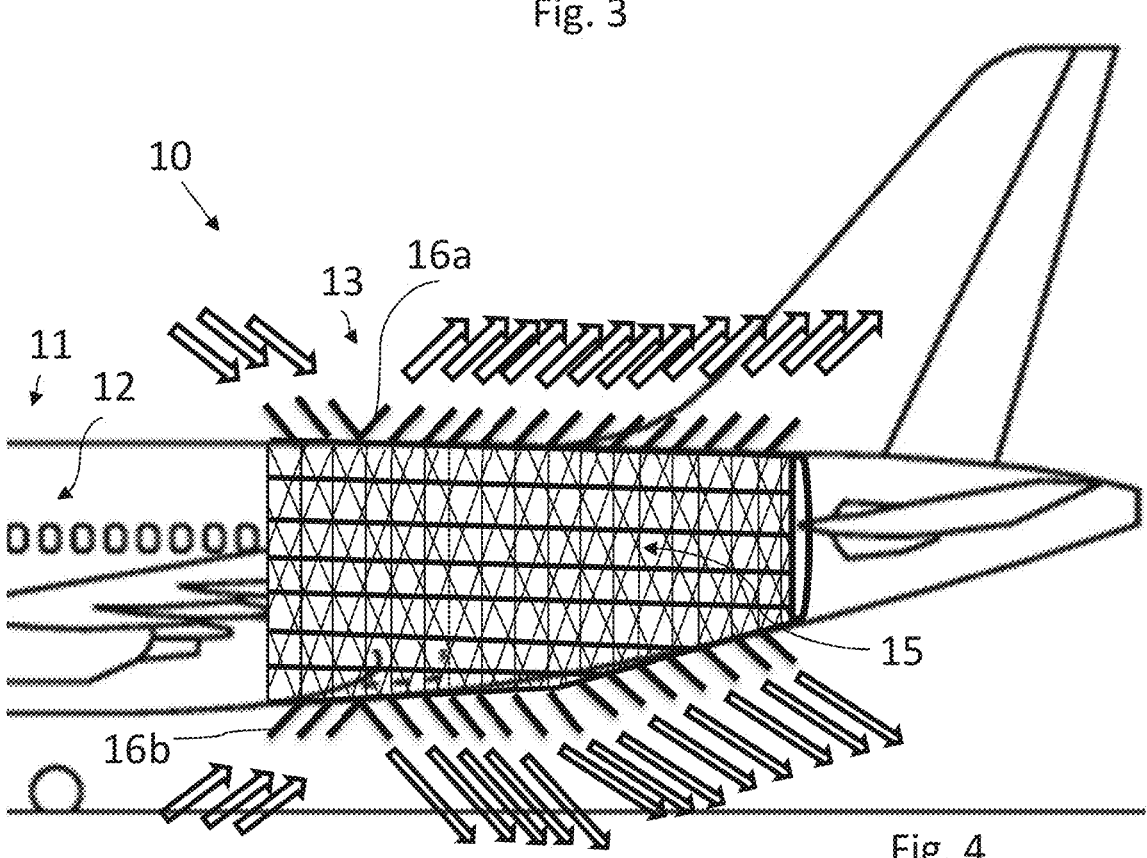
FIG. 4 shows a schematic illustration in a side view of an aft fuselage of the fuselage for an aircraft according to a further embodiment of the disclosure herein in an opened state comprising a first skin area which is openable away from a flight direction and a second skin area which is openable towards the flight direction of the aircraft.

FIG. 4 shows a schematic illustration in a side view of an aft fuselage of the fuselage 10 for an aircraft 1 according to a further embodiment of the disclosure herein in an opened state comprising a first skin area 16a which is openable away from a flight direction and a second skin area 16b which is openable towards the flight direction of the aircraft 1.

The fuselage 10 of FIG. 4 substantially corresponds to the fuselage of FIG. 3, wherein the fuselage 10 here comprises the first skin area 16a being configured as the first group of skin tiles, which are openable away from the flight direction and the second skin area 16b being configured as the second group of skin tiles, which are openable towards the flight direction of the aircraft 1.

Therefore, a hinge axis H (as it is illustrated in FIG. 6) of the skin tiles 16 can be arranged such that the skin tiles 16 can be configured to be openable away from or towards a flight direction, respectively. Thus, by opening the second group of skin tiles 16b towards the flight direction a forced venting of the compartment due to aerodynamic pressure can be provided. Alternatively or additionally, the compartment can have a compartment pressure that is higher than an ambient pressure for improving the venting of the compartment. The hinge axis H can be substantially oriented tangentially in relation to a circumference of the fuselage 10.

An entry of air into the second fuselage section 13 and an exit of air or fluid from the second fuselage section 13 is illustrated by arrows.

Figure 5:
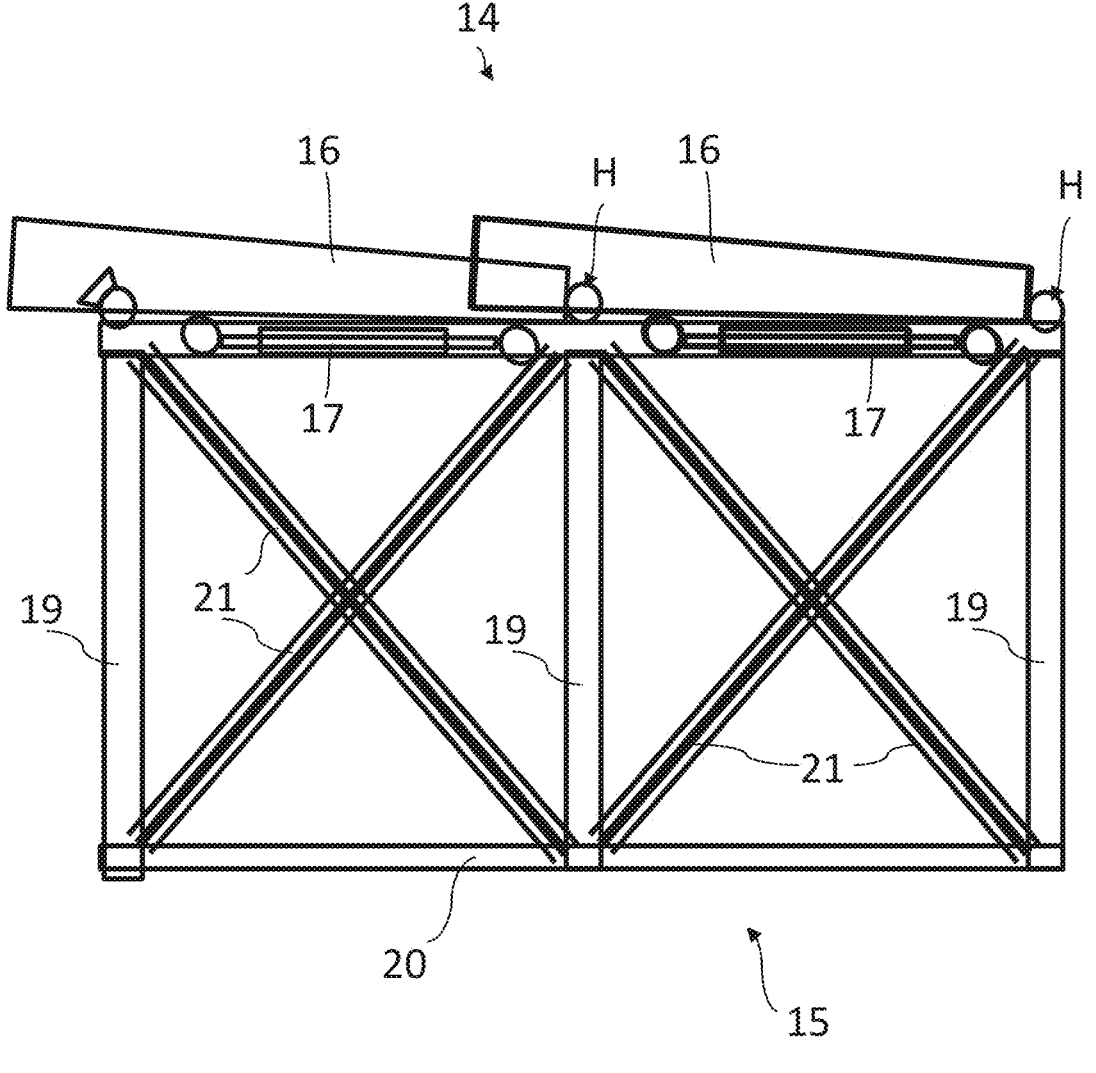
FIG. 5 shows a schematic illustration in a detail view of the second fuselage section according to FIG. 2 in the closed state.

FIG. 5 shows a schematic illustration in a detail view of the second fuselage section 13 according to FIG. 2 in the closed state. FIG. 6 shows a schematic illustration in a detail view of the second fuselage section 13 according to FIG. 3 or 4 in the opened state.

For example, the space frame structure 15 can comprise a plurality of frames 19 extending along a circumference of the fuselage 10. Furthermore, the space frame structure 15 can comprise a plurality of stringers 20 extending along a longitudinal axis of the fuselage 10, wherein the stringers 20 are coupled to the frames 19. Additionally, the space frame structure 15 can comprise a plurality of trusses 21 extending diagonal between the frames 19 and/or the stringers 20. The trusses 21 can be configured as stiffening beams or as stiffening cables.

Optionally, at least a section of the space frame structure 15 can comprise a flame deflector shielding. Alternatively or additionally, a flameless venting device for retaining flames can be placed on an inner side of the at least one skin area 16 and configured to cover an opening 18 in the space frame structure 15 when the at least one skin area 16 is open. Air or fluid can enter or leave the second fuselage section 13 through the opening 18.

For example, the at least one skin area 16 is configured reclosable, in particular reclosable during flight. Hence, the fuselage 10 can be reused or keep on its mission after reclosing the at least one skin area 16. Furthermore, the venting effect can be used again. Therefore, the at least one skin area 16 can be opened after being reclosed.

Therefore, the second fuselage section 13 may further comprise an actuator 17, which is arranged and configured to open the at least one skin area 16 by pivoting about a hinge axis H. For example, the actuator 17 can be configured as or comprise a hydraulic, an electro mechanical or a pneumatic pivot mechanism. The hinge axis H can be substantially oriented tangentially in relation to the circumference of the fuselage 10.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and example embodiments. Many other examples will be immediately and directly clear to a person skilled in the art on the basis of his knowledge in the art in consideration of the above description.

The example embodiments have been chosen and described in order to be able to present the principles underlying the disclosure herein and their application possibilities in practice in the best possible way. As a result, those skilled in the art can optimally modify and utilize the disclosure herein and its various example embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 aircraft
10 fuselage
11 first fuselage section
12 load bearing outer skin
13 second fuselage section
14 non-load bearing outer skin
15 space frame structure
16 at least one skin area
16a first skin area
16b second skin area
17 actuator
18 opening in the space frame structure
19 frame
20 stringer
21 truss
H hinge axis

The invention claimed is:

1. A fuselage for an aircraft or spacecraft, the fuselage comprising:
   a first fuselage section comprising a support structure with a load bearing outer skin; and
   a second fuselage section comprising:
      a non-load bearing outer skin that comprises at least a first group of skin tiles and a second group of skin tiles, which are each configured for venting a compartment, wherein the compartment is at least sectionwise enclosed by the first and second groups of skin tiles; and
      a space frame structure for supporting the non-load bearing outer skin;
      wherein skin tiles of the first and second groups of skin tiles are each pivotable into and between a closed state and an open state, respectively;
      wherein the first group of skin tiles is configured for being opened independently of the second group of skin tiles; and
      wherein the first group of skin tiles is configured for being opened about a different angle from the second group of skin tiles.

2. The fuselage according to claim 1, wherein:
   the first group of skin tiles is at an upper region of the second fuselage section; and
   the second group of skin tiles is at a lateral region of the second fuselage section.

3. The fuselage according to claim 1, wherein:
   the first group of skin tiles is at an upper region of the second fuselage section; and
   the second group of skin tiles is at a lower region of the second fuselage section.

4. The fuselage according to claim 1, wherein the skin tiles of the first and/or second groups of skin tiles are each configured for being opened by pivoting about an angle in a range of 0° to 90°.

5. The fuselage according to claim 4, wherein:

the angle of 0° corresponds to the closed state of each of the skin tiles; and in the closed state, each of the skin tiles area prevents an exchange of gas and condensed mass between the compartment and an environment.

6. The fuselage according to claim 4, wherein the first group of skin tiles and/or the second group of skin tiles are configured such that each of the skin tiles thereof are locked to the space frame structure in the closed state.

7. The fuselage according to claim 4, wherein;

each of the skin tiles of the first and/or second groups of skin tiles comprises a hinge axis;

the hinge axis is substantially oriented tangentially relative to a circumferential direction of the fuselage; and the hinge axis allows a pivoting of one of the skin tiles that comprises the hinge axis away from a flight direction.

8. The fuselage according to claim 7, wherein the second fuselage section further comprises an actuator, which is arranged and configured to open, by pivoting about the hinge axis, at least one skin tile of the first or second groups of skin tiles.

9. The fuselage according to claim 7, wherein the hinge axis of each of the skin tiles of the first and second groups of skin tiles is on either a forward edge or an aft edge of each of the skin tiles.

10. The fuselage according to claim 1, wherein:

at least some of the skin tiles of the first group of skin tiles sectionwise overlap an adjacent skin tile of the first group of skin tiles when in the closed state; and/or at least some of the skin tiles of the second group of skin tiles sectionwise overlap an adjacent skin tile of the second group of skin tiles when in the closed state.

11. The fuselage according to claim 1, wherein at least a section of the space frame structure comprises a flame deflector shielding.

12. The fuselage according to claim 1, comprising a flameless venting device for retaining flames, wherein the flameless venting device is on an inner side of at least one of the skin tiles of the first and/or second groups of skin tiles and is configured to cover an opening in the space frame structure when the at least one skin tile is in an opened state.

13. The fuselage according to claim 1, wherein the first and/or second groups of skin tiles are configured for being reclosable during flight.

14. The fuselage according to claim 1, wherein the second fuselage section is aft of the first fuselage section.

15. An aircraft or spacecraft with the fuselage according to claim 1.

16. The fuselage according to claim 1, wherein the skin tiles of the first and/or second groups of skin tiles are each configured for being opened by pivoting an angle in a range of 0° to 60°.

17. The fuselage according to claim 1, wherein the skin tiles of the first and/or second groups of skin tiles are each configured for being opened by pivoting an angle in a range of 0° to 45°.

18. The fuselage according to claim 1, wherein:

the first group of skin tiles comprises a first subgroup, which comprises at least one skin tile, and a second subgroup, which comprises at least one skin tile;

the at least one skin tile of the first subgroup is located forward, in a direction of a longitudinal axis of the fuselage, of the at least one skin tile of the second subgroup;

the at least one skin tile of the first subgroup is pivotable, when moving from the closed state towards the open state thereof, in a first direction;

the at least one skin tile of the second subgroup is pivotable, when moving from the closed position towards the open state thereof, in a second direction;

the first direction is opposite the second direction, such that the at least one skin tile of the first subgroup is, when in the open state, open towards a flight direction and the at least one skin tile of the first subgroup is, when in the open state, open away from the flight direction.

19. The fuselage according to claim 18, wherein:

the second group of skin tiles comprises a first subgroup, which comprises at least one skin tile, and a second subgroup, which comprises skin tile;

the at least one skin tile of the first subgroup of the second group of skin tiles is located forward, in a direction of a longitudinal axis of the fuselage, of the at least one skin tile of the second subgroup of the second group of skin tiles;

the at least one skin tile of the first subgroup of the second group of skin tiles is pivotable, when moving from the closed position towards the open state thereof, in the first direction;

the at least one skin tile of the second subgroup of the second group of skin tiles is pivotable, when moving from the closed position towards the open state thereof, in the second direction;

the first direction is opposite the second direction, such that the at least one skin tile of the second subgroup of the second group of skin tiles is, when in the open state, open towards a flight direction and the at least one skin tile of the first subgroup of the second group of skin tiles is, when in the open state, open away from the flight direction.

20. The fuselage according to claim 1, wherein:

the second group of skin tiles comprises a first subgroup, which comprises at least one skin tile, and a second subgroup, which comprises skin tile;

the at least one skin tile of the first subgroup is located forward, in a direction of a longitudinal axis of the fuselage, of the at least one skin tile of the second subgroup;

the at least one skin tile of the first subgroup is pivotable, when moving from the closed position towards the open state thereof, in a first direction;

the at least one skin tile of the second subgroup is pivotable, when moving from the closed position towards the open state thereof, in a second direction;

the first direction is opposite the second direction, such that the at least one skin tile of the second subgroup of the second group of skin tiles is, when in the open state, open towards a flight direction and the at least one skin tile of the first subgroup of the second group of skin tiles is, when in the open state, open away from the flight direction.

* * * * *